(12) United States Patent
Shiu et al.

(10) Patent No.: US 6,765,887 B1
(45) Date of Patent: Jul. 20, 2004

(54) METHOD AND APPARATUS FOR PROCESSING A RECEIVED TRANSMISSION BASED ON PROCESSING DELAYS REQUIREMENT

(75) Inventors: Da-Shan Shiu, San Jose, CA (US); Avneesh Agrawal, San Jose, CA (US); Daisuke Terasawa, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 760 days.

(21) Appl. No.: 09/657,220

(22) Filed: Sep. 6, 2000

(51) Int. Cl.[7] ................................................ H04Q 7/00
(52) U.S. Cl. ...................... 370/329; 370/329; 455/452
(58) Field of Search .............................. 370/335, 342, 370/468, 535, 537, 441, 320, 350, 411–419, 465, 338, 329; 375/146, 147; 455/452

(56) References Cited

U.S. PATENT DOCUMENTS

| | | | |
|---|---|---|---|
| 6,374,112 B1 * | 4/2002 | Widegren et al. | 455/452.2 |
| 6,452,915 B1 * | 9/2002 | Jorgensen | 370/338 |
| 6,606,311 B1 * | 8/2003 | Wang et al. | 370/338 |
| 6,614,775 B1 * | 9/2003 | Chang et al. | 370/341 |

FOREIGN PATENT DOCUMENTS

| EP | 1009174 | 4/2000 |
|---|---|---|

OTHER PUBLICATIONS

Universal Mobile Telecommunications System (UMTS); Multiplexing and channel coding (FDD).

* cited by examiner

Primary Examiner—Douglas Olms
Assistant Examiner—Robert W. Wilson
(74) Attorney, Agent, or Firm—Philip R Wadsworth; Charles D Brown; Timothy F Loomis (57) ABSTRACT

Techniques for processing transmissions in a communications (e.g., CDMA) system. Samples are received and assembled into one or more traffics, with each traffic including one or more portions (e.g., radio frames, coded blocks) suitable for processing independently. The priority of each portion is determined based on its processing delays requirement, which can be estimated based on, for example, the time interval over which the samples in the traffic are interleaved, the processing deadline, and so on. A portion in a traffic having the highest priority is selected and scheduled for processing. The processing can include reordering the samples in the selected portion in accordance with a particular reordering scheme, accumulating redundant samples and inserting place holders (e.g., don't cares) for deleted samples in the selected portion, and decoding the reordered samples in the selected portion. The processing of the traffic may be interrupted, in which case the state information related to the processing of the interrupted traffic is saved. A portion in another traffic can then be selected and scheduled for processing. Thereafter, the processing on the interrupted traffic can be resumed using the saved state information.

42 Claims, 9 Drawing Sheets

METHOD AND APPARATUS FOR PROCESSING A RECEIVED TRANSMISSION BASED ON PROCESSING DELAYS REQUIREMENT

CROSS-REFERENCE TO RELATED APPLICATIONS

This application is related to U.S. patent application Ser. No. 09/655,666, now issued as U.S. Pat. No. 6,624,767, entitled "DATA BUFFER STRUCTURE FOR ASYNCHRONOUSLY RECEIVED PHYSICAL CHANNELS IN A CDMA SYSTEM," filed on the same day herewith, and incorporated herein by reference.

BACKGROUND OF THE INVENTION

I. Field of the Invention

The present invention relates to data communication. More particularly, the present invention relates to a novel and improved method and apparatus for processing a received signal based on the processing delays requirement of the communication.

II. Description of the Related Art

A modern day communications system is required to support a variety of applications. One such communications system is a code division multiple access (CDMA) system that supports voice and data communication between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention and incorporated herein by reference.

A CDMA system is typically designed to conform to one or more standards. One such first generation standard is the "TIA/EIA/IS-95 Terminal-Base Station Compatibility Standard for Dual-Mode Wideband Spread Spectrum Cellular System," hereinafter referred to as the IS-95 standard and incorporated herein by reference. The IS-95 CDMA systems are able to transmit voice data and (albeit not efficiently) packet data. A newer generation standard that can more efficiently transmit packet data is offered by a consortium named "$3^{rd}$ Generation Partnership Project" (3GPP) and embodied in a set of documents including Document Nos. 3G TS 25.211, 3G TS 25.212, 3G TS 25.213, and 3G TS 25.214, which are readily available to the public. The 3GPP standard is hereinafter referred to as the W-CDMA standard and incorporated herein by reference.

The W-CDMA standard defines a channel structure capable of supporting a number of users and designed for efficient transmission of packet data. In accordance with the W-CDMA standard, data to be transmitted is processed as one or more "transport" channels at a higher signaling layer. The transport channels support concurrent transmission of different types of services (e.g., voice, video, data, and so on). The transport channels are then mapped to one or more "physical" channels that are assigned to a user terminal for a communication (e.g., a call).

The W-CDMA standard allows for a great deal of flexibility in the processing of the transport channels. For example, data for a particular transport channel can be coded using a convolutional code, a Turbo code, or not coded at all. Also, the data can be interleaved over one of four different time intervals (i.e., 10 msec, 20 msec, 40 msec, or 80 msec) to provide temporal diversity against deleterious path effects (e.g., fading, multipaths, and so on). Different combinations of coding scheme and interleaving interval can be selected to provide improved performance for different types of services. For example, enhanced efficiency and performance may be obtained by processing packet data using Turbo code and a long interleaving interval, which may result in longer processing delays. In contrast, voice and video data may be processed using convolutional code and a short interleaving interval since long processing delays cannot be tolerated.

The user terminal in a W-CDMA system may receive multiple transmissions concurrently on multiple transport channels. For costs consideration, the user terminal is typically designed with one set of processing units (e.g., one decoder) for processing the transmissions. Thus, techniques that can be used to efficiently process multiple transmissions received concurrently based on their processing delays requirements are highly desirable.

SUMMARY OF THE INVENTION

The present invention provides techniques to efficiently process traffics received on multiple transport channels based on their processing delays requirements. The traffics can correspond to different types of services and may have different processing delays requirements. These delays requirements can be estimated at the receiver unit based on known parameters (e.g., fields in the traffics) or based on the manners in which the traffics have been processed (e.g., the time intervals over which the traffics have been interleaved). A controller then intelligently schedules the processing of the traffics such that the processing delays requirements are satisfied.

An embodiment of the invention provides a method for processing transmissions in a communications system (e.g., a CDMA system that conforms to W-CDMA standard, or some other system). In accordance with the method, samples are received and assembled into one or more traffics, with each traffic including one or more portions suitable for processing independently. The priority of each portion is then determined based on its processing delays requirement, and a portion in a first traffic having the highest priority is selected and scheduled for processing in accordance with a particular processing scheme. The determination of the priorities of the portions, the selection of the highest priority portion, and the scheduling of the selected portion can be repeated for each scheduling period or upon receiving an indication that another portion can be processed.

Another embodiment of the invention provides a receiver unit operative to process transmissions in a communications system (e.g., a CDMA system that conforms to W-CDMA standard). The receiver unit includes a channel processor, a buffer, a data processor, and a controller. The channel processor receives and assembles samples into one or more traffics, with each traffic including one or more portions suitable for processing independently. The buffer stores the traffics, and the data processor retrieves a particular portion of a particular traffic from the buffer and processes the retrieved portion in accordance with a particular processing scheme. The controller determines the priority of each portion stored in the buffer based on its processing delays requirement, selects a portion in a first traffic having the highest priority, and schedules the selected portion for processing by the data processor. The data processor can reorder the samples in the selected portion in accordance with a particular reordering scheme, accumulate redundant samples, and insert place holders for deleted samples. The receiver unit typically further includes a decoder that receives and decodes portions that have been processed by the data processor.

Various aspects, embodiments, and features of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION OF THE SPECIFIC EMBODIMENTS

Figure 1:
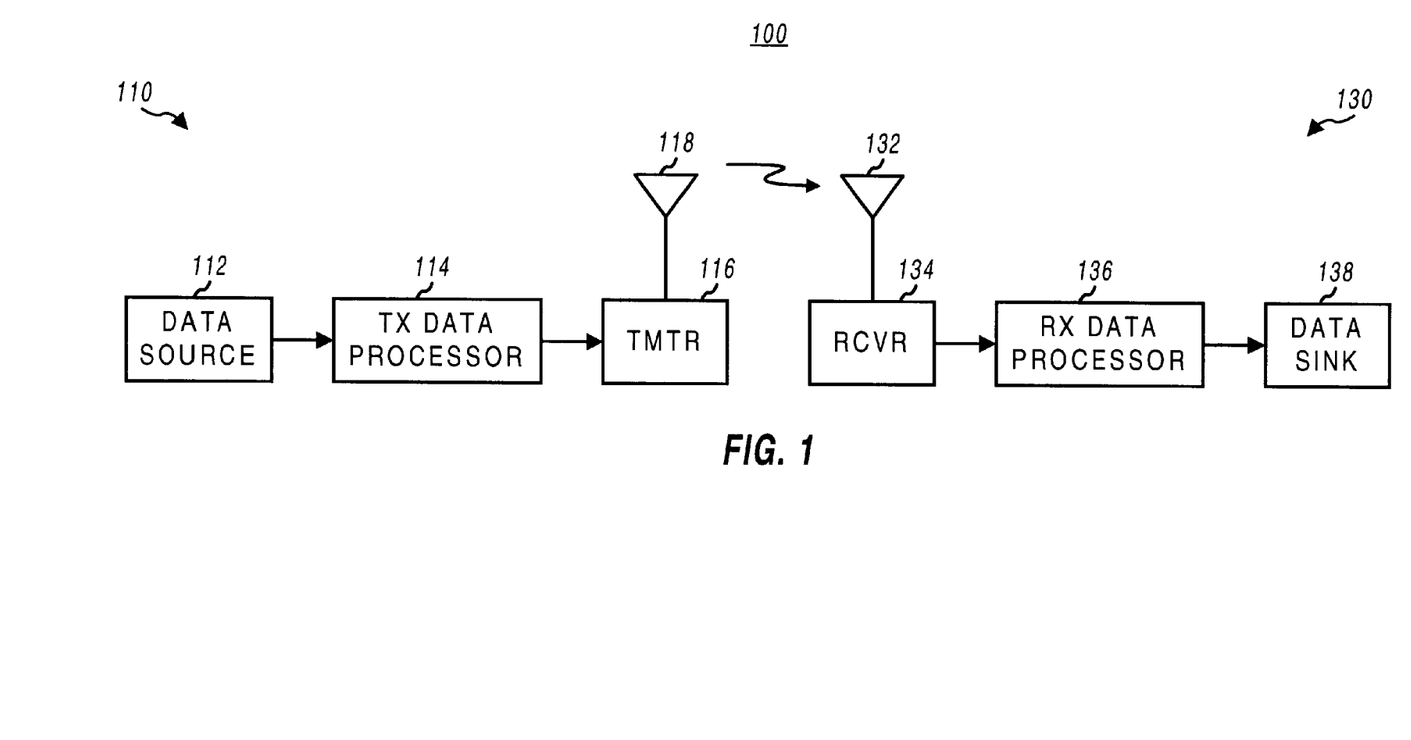
FIG. 1 is a simplified block diagram of a communications system that can implement the invention.

FIG. 1 is a simplified block diagram of a communications system 100 that can implement the invention. At a transmitter unit 110, data is sent, typically in blocks, from a data source 112 to a transmit (TX) data processor 114 that formats, codes, and processes the data to generate one or more analog signals. The analog signals are then provided to a transmitter (TMTR) 116 that (quadrature) modulates, filters, amplifies, and upconverts the baseband signals to generate a modulated signal. The modulated signal is then transmitted via an antenna 118 to one or more receiver units.

At a receiver unit 130, the transmitted signal is received by an antenna 132 and provided to a receiver (RCVR) 134. Within receiver 134, the received signal is amplified, filtered, downconverted, (quadrature) demodulated, and digitized to generate inphase (I) and quadrature (Q) samples. The samples are then decoded and processed by a receive (RX) data processor 136 to recover the transmitted data. The decoding and processing at receiver unit 130 are performed in a manner complementary to the coding and processing performed at transmitter unit 110. The recovered data is then provided to a data sink 138.

The signal processing described above supports transmissions of voice, video, packet data, messaging, and other types of communication in one direction. A bi-directional communications system supports two-way data transmission. However, the signal processing for the other direction is not shown in FIG. 1 for simplicity.

Communications system 100 can be a code division multiple access (CDMA) system, a time division multiple access (TDMA) communications system (e.g., a GSM system), a frequency division multiple access (FDMA) communications system, or other multiple access communications system that supports voice and data communication between users over a terrestrial link. In a specific embodiment, communications system 100 is a CDMA system that conforms to the W-CDMA standard.

Figure 2A:
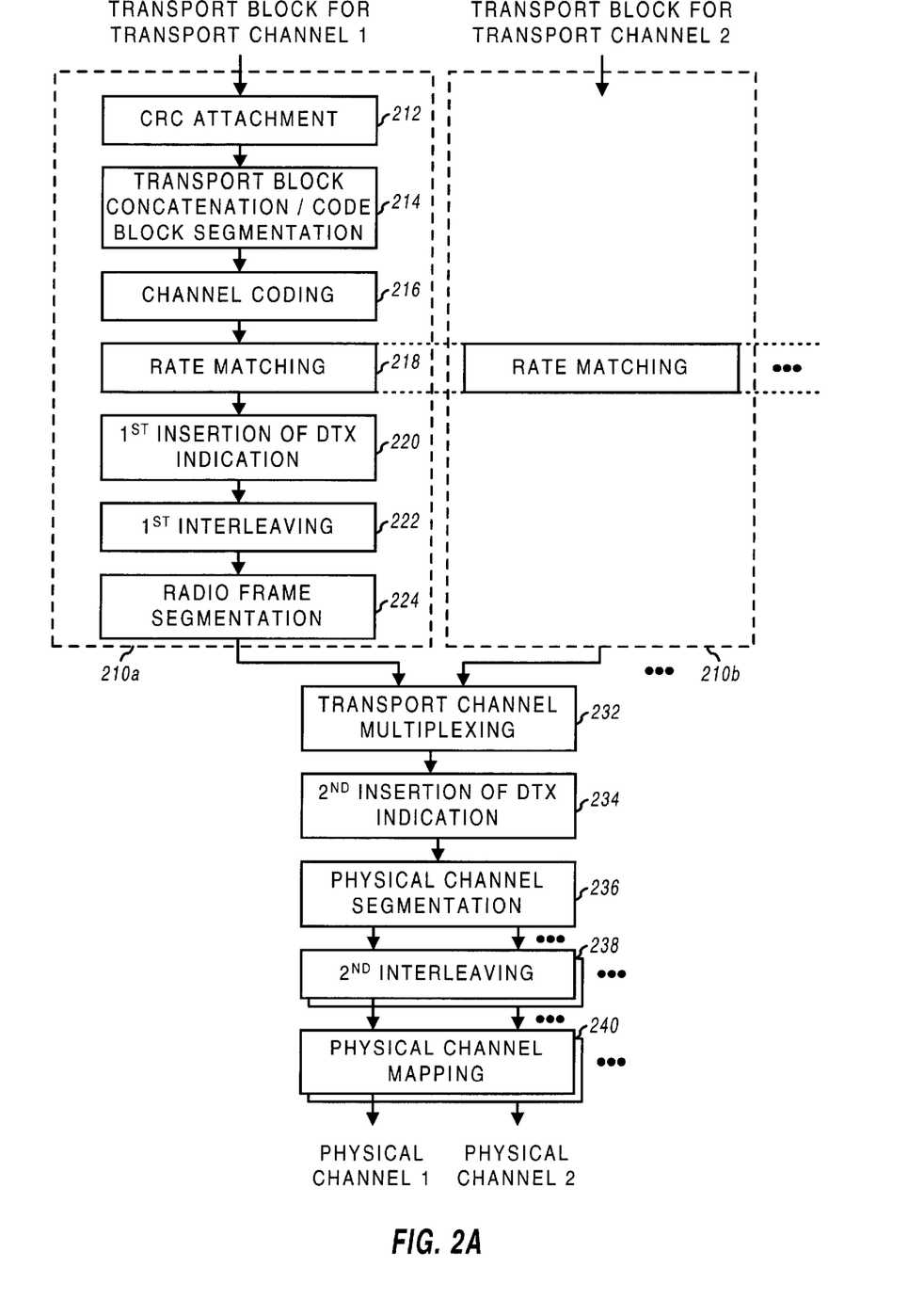
FIGS. 2A and 2B are diagrams of the signal processing at a transmitter unit and a receiver unit, respectively, for a downlink data transmission in accordance with the W-CDMA standard.

FIG. 2A is a diagram of the signal processing at the transmitter unit for a downlink data transmission in accordance with the W-CDMA standard. The downlink refers to transmission from a base station to a user terminal, and the uplink refers to transmission from the user terminal to the base station. The signal processing shown in FIG. 2A is generally performed by transmit data processor 114 in FIG. 1. The upper signaling layers of the W-CDMA system support concurrent transmission of a number of transport channels, with each transport channel capable of carrying data for a particular communication (e.g., voice, video, data, and so on). The data for each transport channel is provided, in blocks that are also referred to as transport blocks, to a respective transport channel processing section 210.

Within transport channel processing section 210, each transport block is used to calculate the cyclic redundancy check (CRC) bits, in block 212. The CRC bits are attached to the transport block and used at the receiver unit for error detection. A number of CRC coded blocks are then serially concatenated together, in block 214. If the total number of bits after concatenation is greater than the maximum size of a code block, the bits are segmented into a number of equal-sized code blocks. Each code block is then coded with a particular coding scheme (e.g., a convolutional code, a Turbo code) or not coded at all, in block 216.

Rate matching is then performed on the code bits, in block 218. Rate matching is performed in accordance with a rate-matching attribute assigned by higher signaling layers. On the uplink, bits are repeated or punctured (i.e., deleted) such that the number of bits to be transmitted matches the number of bits available. On the downlink, unused bit positions are filled with discontinuous transmission (DTX) bits, in block 220. The DTX bits indicate when a transmission should be turned off and are not actually transmitted.

The bits are then interleaved in accordance with a particular interleaving scheme to provide time diversity, in block 222. In accordance with the W-CDMA standard, the time interval over which interleaving is performed can be selected from a set of possible time intervals (e.g., 10 msec, 20 msec, 40 msec, or 80 msec). The interleaving time interval is also referred to as a transmission time interval (TTI) and is provided to the receiver unit via a transport format combination indicator (TCFI) that is transmitted on a physical channel.

When the selected TTI is longer than 10 msec, the sequence of interleaved bits is segmented and mapped onto consecutive radio frames, in block 224. Each radio frame corresponds to a transmission over a particular time interval (e.g., 10 msec). In accordance with the W-CDMA standard, a sequence may be interleaved over 1, 2, 4, or 8 radio frames.

The radio frames from all active transport channel processing sections 210 are then serially multiplexed into a coded composite transport channel (CCTrCH), in block 232. DTX bits may then be inserted to the multiplexed radio frames such that the number of bits to be transmitted matches the number of bits available on the physical channel (s) used for the data transmission, in block 234. If more than one physical channel is used, the bits are segmented among the physical channels, in block 236. The bits in each radio frame of each physical channel are then interleaved to provide additional time diversity, at block 238. The interleaved radio frames are then mapped to their respective physical channels, at block 240. The subsequent signal processing to generate a modulated signal suitable for transmission to a user terminal is known in the art and not described herein.

Figure 2B:
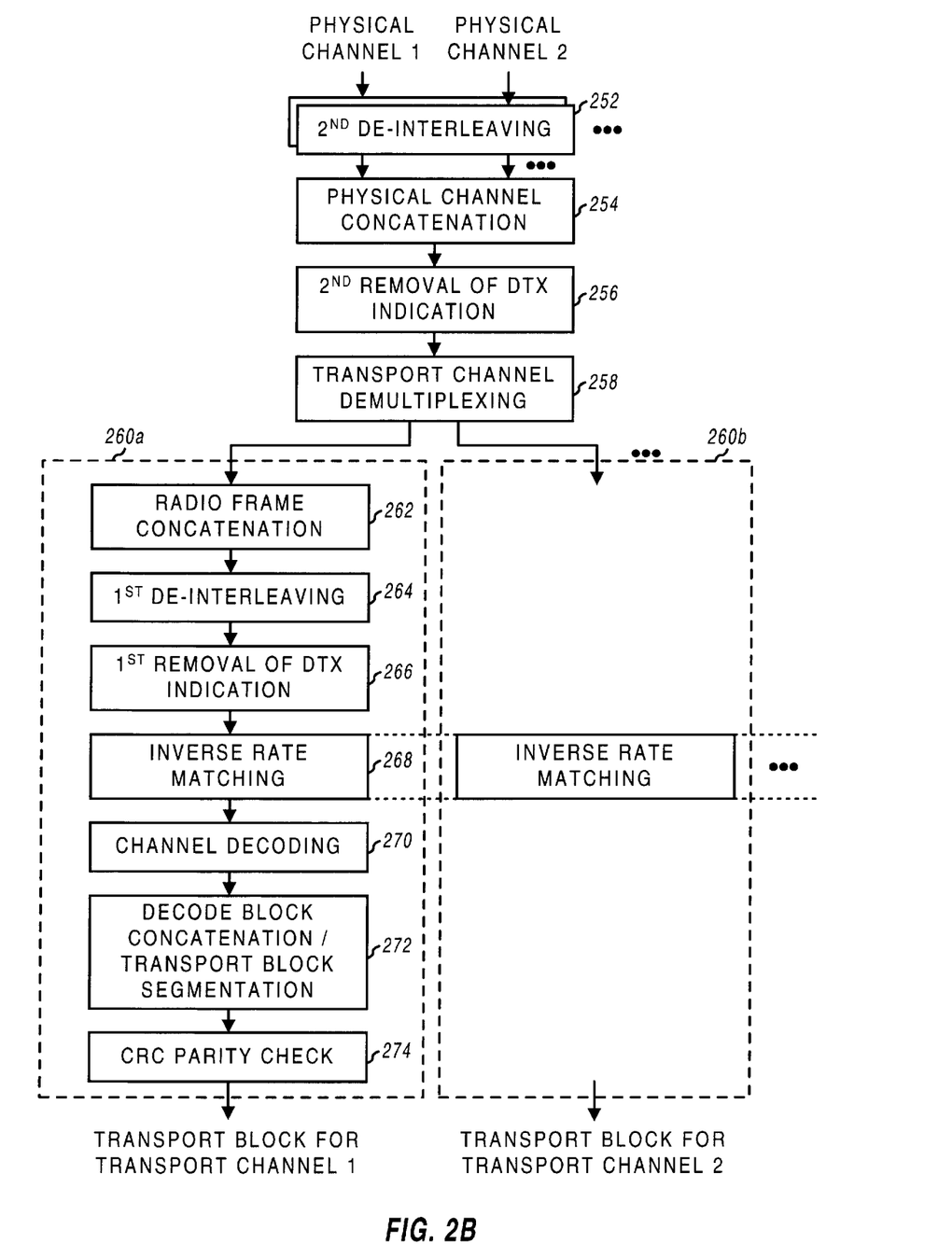

FIG. 2B is a diagram of the signal processing at the receiver unit for a downlink data transmission in accordance with the W-CDMA standard. The signal processing shown in FIG. 2B is complementary to that shown in FIG. 2A, and is generally performed by receive data processor 136 in FIG. 1. Initially, the modulated signal is received, conditioned, digitized, and processed to provide symbols corresponding to each physical channel used for the data transmission. Each symbol has a particular resolution (e.g., 4-bit) and corresponds to a transmitted bit. The symbols in each radio frame of each physical channel are de-interleaved, in block 252, and the de-interleaved symbols from all physical channels are concatenated, in block 254. For a downlink transmission, non-transmitted bits are detected and removed, in block 256. The symbols are then demultiplexed into various transport channels, in block 258. The radio frames for each transport channel are then provided to a respective transport channel processing section 260.

Within transport channel processing section 260, the radio frames are concatenated into "traffics", in block 262. Each traffic includes one or more radio frames and corresponds to a particular interleaving interval (i.e., a particular TTI) used at the transmitter unit. The symbols within each traffic are de-interleaved, in block 264, and non-transmitted symbols are removed, in block 266. Inverse rate matching is then performed to accumulate repeated symbols and insert "don't cares" for punctured bits, in block 268. Each coded block in the traffic is then decoded, in block 270. The decoded blocks are then concatenated and segmented into their respective transport blocks, in block 272. Each transport block is then checked for error using the CRC bits, in block 274.

In many communications systems including the W-CDMA system, interleaving is used to provide temporal diversity to combat against deleterious path effects. The interleaving reduces the likelihood of receiving a string of consecutive errors due to, for example, fading, impulse noise, multipath, and so on. At the receiver unit, the received symbols are reordered and a string of symbols received in error can be effectively spread over the entire interleaving interval. Spreading the error symbols can improve the likelihood of correct decoding of the received symbols in the interleaving interval.

For enhanced flexibility and improved performance, the W-CDMA standard allows for interleaving over different transmission time intervals. Specifically, the TTI can be selected to be 10 msec, 20 msec, 40 msec, or 80 msec. Longer TTIs provide enhanced temporal diversity and can be used to combat deep fades in a transmission. However, longer TTIs also equate to longer processing delays at both the transmitter and receiver units, since a longer period of data needs to be buffered for the interleaving and de-interleaving. Shorter TTIs provide less temporal diversity, but have shorter processing delays.

The selection of the TTI to use for a particular data transmission is not defined by the W-CDMA standard, and is left open as an operating parameter. Generally, longer TTIs are used for transmissions that are less sensitive to processing delays (e.g., traffic data, some signaling data, and so on) and shorter TTIs are used for transmissions that are more sensitive to processing delays (e.g., voice, video, and so on).

In accordance with the invention, the transmission time interval of a received transmission is used to control the processing of the transmission. Transmissions having shorter TTIs are presumed to be sensitive to processing delays and are given a higher priority for processing. Conversely, transmissions having longer TTIs are presumed to be more insensitive to processing delays and are given a lower priority for processing. In a specific embodiment of the invention, if multiple transport channels are received concurrently, the transport channel utilizing the shortest TTI is processed first, the transport channel utilizing the next shortest TTI is processed next, and so on, and the transport channel utilizing the longest TTI is processed last.

Figure 3:
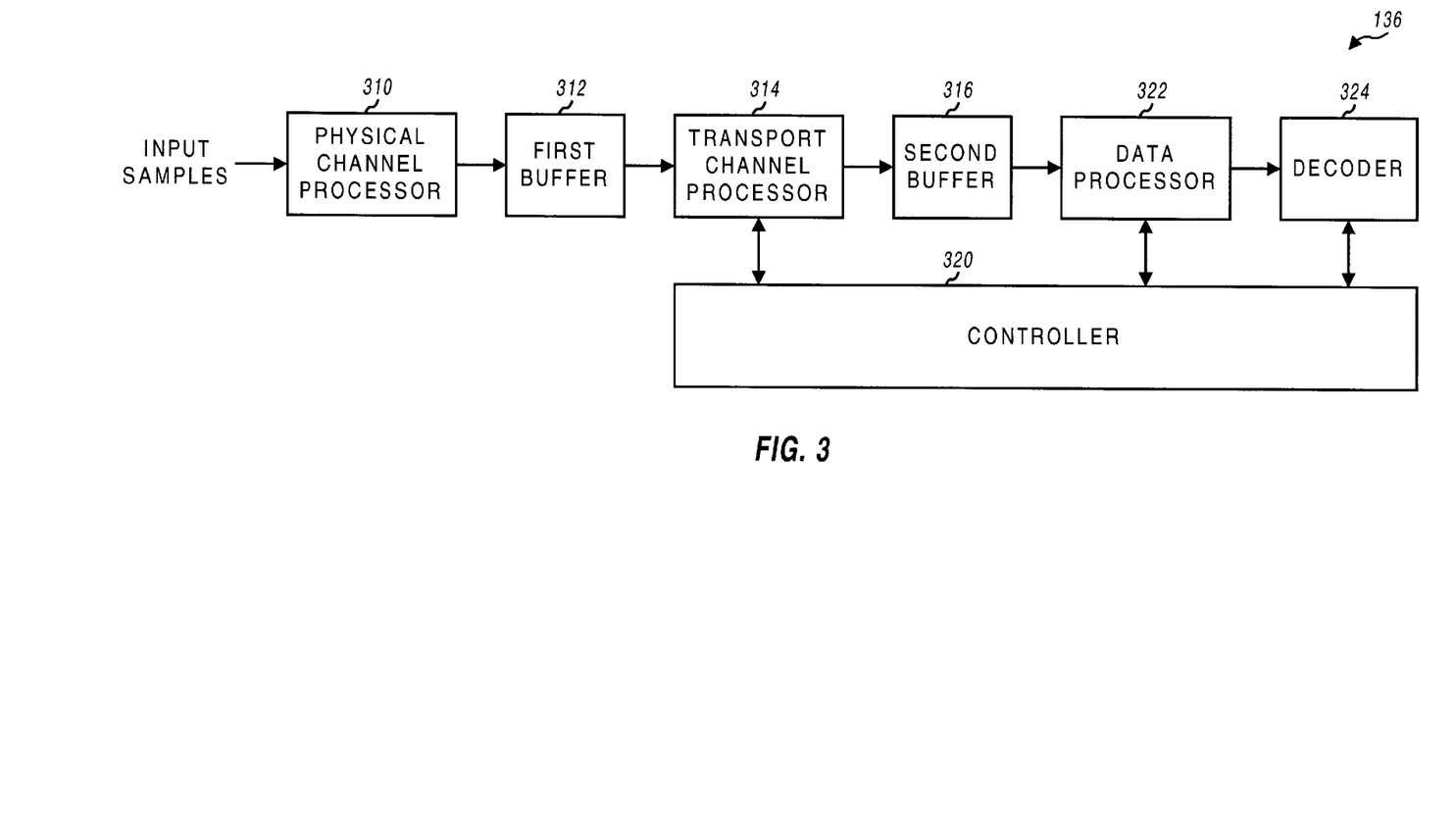
FIG. 3 is a simplified block diagram of an embodiment of a receive data processor at the receiver unit.

FIG. 3 is a simplified block diagram of an embodiment of receive data processor 136, which is suitable for processing a downlink data transmission in accordance with the W-CDMA standard. Receive data processor 136 can be used to perform the signal processing described above in FIG. 2B. The received signal is conditioned and digitized within receiver 134 to provide digitized samples. A physical channel processor 310 receives and processes (e.g., despreads, decovers, and demodulates) the samples to provide samples corresponding to one or more physical channels. The samples are then stored to a first buffer 312. The samples in first buffer 312 are retrieved by a transport channel processor 314 in a particular order to provide de-interleaving of the samples, complementary to the interleaving in block 238.

Transport channel processor 314 concatenates the samples received from various physical channels into a common sample sequence, demultiplexes the sequence into respective transport channels, and provides the samples for each transport channel into a second buffer 316. The concatenation and demultiplexing are performed in a manner complementary to that performed in the physical channel segmentation block 236 and the transport channel multiplexing block 232, respectively. Transport channel processor 314 further concatenates radio frames for each transmission time interval into a traffic. When all radio frames for a particular traffic are available, transport channel processor 314 signals a controller 320, which then schedules the processing (e.g., decoding) of the samples in the traffic. The samples in second buffer 316 are retrieved by a data processor 322 in an order that is complementary to the interleaving in block 222. Prior to decoding, data processor 322 may compact the samples to remove empty periods of no data transmission (i.e., corresponding to the DTX bits) and performs the inverse rate matching complementary to the rate matching performed in block 218. The samples are then provided to a decoder 324.

Decoder 324 performs decoding in a manner complementary to the coding scheme used at the transmitter unit. Specifically, decoder 324 performs Viterbi decoding for convolutionally coded data, Turbo decoding for Turbo coded data, or no decoding or non-coded data. A CRC checker within decoder 324 may further perform error detection based on the appended CRC bits. Decoder 324 then provides the decoded data to the data sink.

FIG. 3 represents a specific design of receive data processor 136. Various other designs can also be implemented and are within the scope of the invention. For example, first buffer 312 and second buffer 316 can be implemented with a single buffer that stores the received symbols. Also, the functions performed by physical channel processor 310 and transport channel processor 314 can be combined and implemented within a single channel processor. A design that combines the first and second buffers and the physical and transport channel processors is described in the aforementioned U.S. patent application Ser. No. 09/655,666 which has issued as U.S. Pat. No. 6,624,767.

Figure 4A:
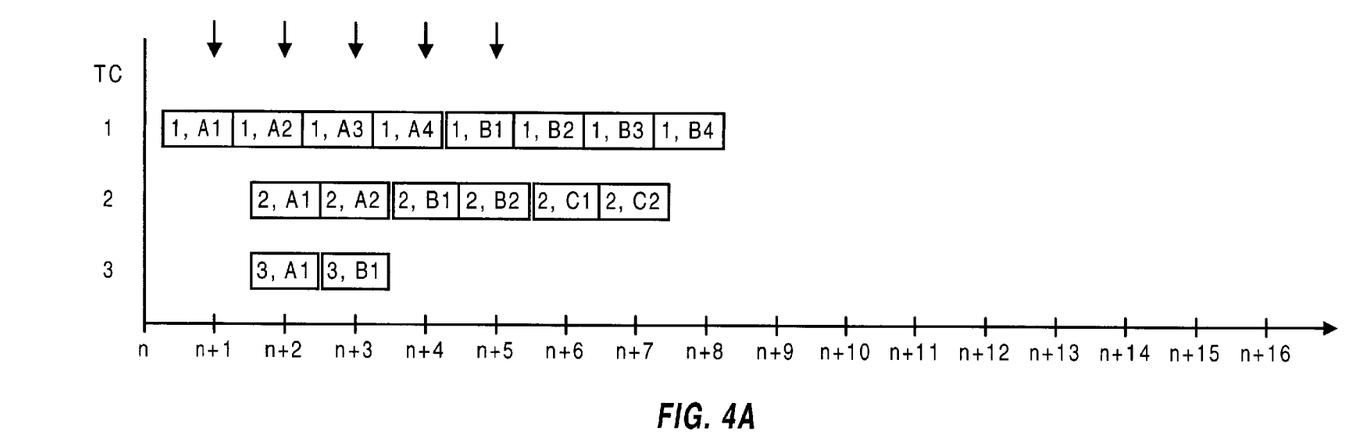
FIG. 4A is a diagram that graphically illustrates the received transport channels in the W-CDMA system.

FIG. 4A is a diagram that graphically illustrates the traffics received on multiple transport channels in the W-CDMA system. The horizontal axis denotes time, which is partitioned into time intervals (i.e., frame intervals) designated with frame indices of n, n+1, n+2, and so on. The frame indices are marked based on the timing of the receiver unit, which may or may not be locked to the timing of the transmitter unit.

Each received radio frame has a duration of one frame interval (e.g., 10 msec) and can start at any arbitrary point in time. A received radio frame is designated as (w, Xy), where w denotes the transport channel number, X denotes the particular traffic, and y denotes the y-th radio frame within traffic X. As shown in FIG. 4A, between frame indices n and n+1, radio frame (1,A1) is received for transport channel 1. Between frame indices n+1 and n+2, radio frame (1,A2) is received for transport channel 1, radio frame (2,A1) is received for transport channel 2, and radio frame (3,A1) is received for transport channel 3. Between frame indices n+2 and n+3, radio frame (1,A3) is received for transport channel 1, radio frame (2,A2) is received for transport channel 2, and radio frame (3,B1) for a new traffic B is received for transport channel 3.

Figure 5:
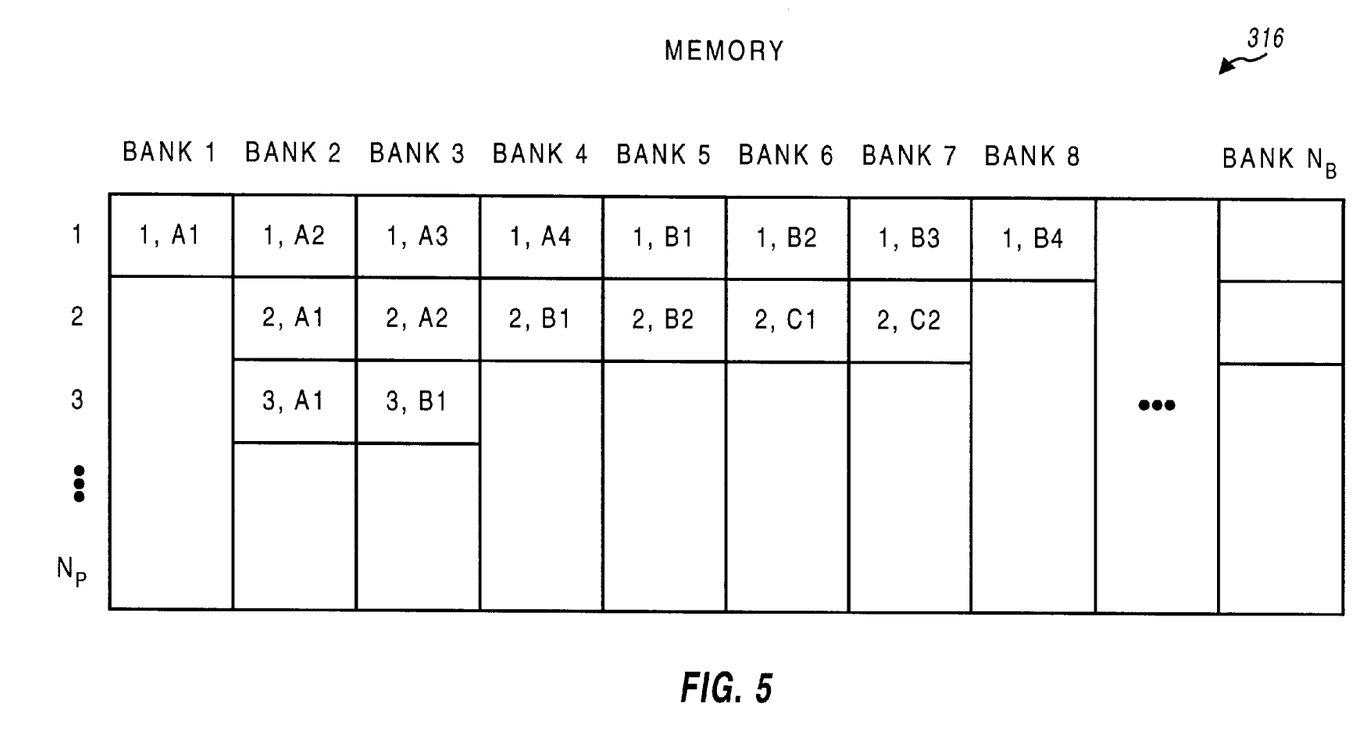
FIG. 5 is a diagram of an embodiment of a buffer used to store the received traffics.

FIG. 5 is a diagram of an embodiment of second buffer 316 used to store the received radio frames. In an embodiment, second buffer 316 is implemented with $N_B$ memory banks, with each memory bank configurable to store up to $N_P$ radio frames. $N_P$ is a design parameter, and a larger $N_P$ allows for concurrent reception and storage of more transport channels. Similarly, $N_B$ is a design parameter and selected for efficient storage and processing. In an embodiment, $N_B$ is selected to be equal to $8+N_E$, where eight banks are used to store up to eight radio frames in the longest TTI and $N_E$ is the number of extra memory banks used to buffer the data prior to decoding. Generally, $N_E$ increases with longer decoding processing delays. The design parameters $N_B$ and $N_P$ are selected based on a number of factors such as, for example, the maximum number of transport channels to be supported, the decoder processing speed and delays, and so on.

In the embodiment shown in FIG. 5, each memory bank is associated with a particular frame interval. For example, radio frames (1,A2), (2,A1), and (3,A1) received starting between frame indices n+1 and n+2 are stored to memory bank 2. Similarly, radio frames (1,A3), (2,A2), and (3,B1) received starting between frame indices n+2 and n+3 are stored to memory bank 3. The remaining radio frames are received and stored in similar manner. For the data transmission shown in FIG. 4A, the radio frames for transport channel 1 are store in the top portion of memory banks 1 through 8, the radio frames for transport channel 2 are stored in the next portion of memory banks 2 through 8, and the radio frames for transport channel 3 are stored to the next portion of memory banks 2 through 5.

In an embodiment, second buffer 316 is implemented as a circular buffer. The radio frames received on consecutive frame intervals are stored to memory banks 1 through $N_B$. The buffer pointer then wraps around and the radio frames received on the next frame interval are then stored to memory bank 1. The number of memory banks and the depth of each memory bank are selected based on the factors described above.

In an embodiment, physical channel processor 310 processes the received samples, stores the samples to first buffer 312, and sends an alert message to transport channel processor 314 after each radio frame is stored to buffer 312. The alert message indicates the completion of a physical channel radio frame, which is a concatenation of one or more transport channel "radio frames" (if no second interleaving is performed). If the TTI of a transport channel is time-varying, then (1) another channel between the transmitter unit (i.e., the base station) and the receiver unit (i.e., the UE) can be used to communicate the sizes (in radio frames) of the transport channel radio frames in order to delimit them, and (2) transport channel processor 314 can deduce from the alert message to conclude whether a transport channel TTI has been reached. However, in accordance with W-CDMA standard, the TTI of a transport channel is fixed for the duration of a call so the transport channel radio frame size is sent once (e.g., during the transport channel setup). In an embodiment, transport channel processor 314 maintains a table that tracks the received radio frames and is used to indicate when a particular traffic is ready for decoding.

Table 1 shows an embodiment of a table used to track the radio frames received on each active transport channel. For each active transport channel, a new row in the table is generated and identified with, for example, the transport channel number, the TTI for that transport channel, the radio frame count, and the physical channel associated with the transport channel. In some system designs, the TTI for a particular transport channel may be dynamically adjusted to provide improved performance. The TTI used for each transport channel is provided as part of a transport format combination indicator (TFCI), which is transmitted on a dedicated physical channel assigned to the user terminal. The TFCI is described in detail in the W-CDMA standard.

As each radio frame is received, transport channel processor 314 matches the physical channels in the table with the physical channel identified in the alert message from physical channel processor 310. If there is a match, transport channel processor 314 increments the radio frame count field of the transport channel by one.

In accordance with the W-CDMA standard, multiple transport channels are multiplexed together to form a (conceptual) CCTrCH. The CCTrCH is then mapped to one or more synchronized physical channels. In one specific implementation, the arrival of a CCTrCH frame is used to trigger an increment of the radio frame count field of all transport channels carried by this CCTrCH.

After the increment, transport channel processor 314 compares the radio frame count to the value stored in the TTI field. If the count equals the TTI, all radio frames for the traffic have been received and the data is available for decoding. Transport channel processor 314 then sends a request message to controller 320 to indicate this condition. In an embodiment, the request message includes the transport channel number, a deadline, and the identity of the last memory bank used to store the radio frames for that traffic. Various deadlines can be used depending on the particular design of the receiver unit. For example, the deadline can be expressed as: deadline=time of reception of the last radio frame+TTI of the associated transport channel. Transport channel processor 314 then resets the radio frame count field to zero.

TABLE 1

| Transport Channel | Transmission Time Interval | Radio Frame Count | Associated Physical Channel |
|---|---|---|---|
| 1 | 8 | 2 | 1 |
| 2 | 2 | 1 | 2 |
| 3 | 1 | 1 | 2 |

Table 1 also shows the content of the table at a particular moment in time. Generally, the scheduling can take place at any time shortly after the arrival of any physical channel radio frame. Referring to FIG. 4A, at frame index n+2, two radio frames (1,A1) and (1,A2) have been received for transport channel 1, one radio frame (2,A1) has been received for transport channel 2, and one radio frame (3,A1) has been received for transport channel 3. Since the radio frame count for transport channel 3 is equal to the TTI, transport channel processor 314 sends a request message to controller 320 indicating that the traffic on transport channel 3 is ready for decoding. Transport channel processor 314 then resets the radio frame count to zero (not yet reflected in Table 1).

Controller 320 receives the request message from transport channel processor 314 and schedules the processing (e.g., decoding) of the traffic. In an embodiment, controller 320 maintains a table that tracks the traffics that are ready for processing and their processing status. As each request message is received, controller 320 generates a new entry in the table. Similarly, as a particular traffic is processed, the corresponding entry in the table is deleted.

Table 2 shows a specific embodiment of a table used to track the state of the traffics that are ready for processing. For each new request message, a new row in the table is generated and identified with, for example, the transport channel number, the deadline for processing the traffic, the BTFD (blind transport format detection) mode, the number of coded blocks to be decoded, the DIL (de-interleaver) count, and the DRM (de-rate matching, or reverse rate matching) count. The BTFD mode indicates whether the format is or is not known by the receiver unit. The DIL count indicates an internal state of the de-interleaver, and may be used to identify the first symbol in the next coded block to be processed. The DRM count indicates an internal state of the inverse rate matching, and may be used to resume the processing of a traffic if it is interrupted. Although not shown in Table 2, controller 320 typically also maintains the index of the last memory bank used to store the radio frame for the traffic, the TTI, and the TFC. Other or different information than that described above can be stored for each traffic and this is within the scope of the invention.

TABLE 2

| Transport Channel | Deadline (msec) | BTFD Mode | Number of Coded Blocks | DIL Count | DRM Count |
|---|---|---|---|---|---|
| 1 | 50 | 0 | 3 | 0 | $e_{ini}$ |
| 2 | 80 | 0 | 5 | 0 | $e_{ini}$ |

Typically, one entry exists in Table 2 for each transport channel. However, in certain situations such as when the transport format of a transport channel needs to be determined, a transport channel may have several entries (rows) in Table 2, with each entry corresponding to a possible transport format.

In a specific embodiment, traffics are scheduled to be processed starting at frame boundary. Controller 320 identifies the traffics that are ready for processing and selects the traffic having the highest priority. At the next frame boundary, controller 320 directs data processor 322 and decoder 324 to start processing the selected traffic.

Various criteria can be used to select the next traffic to process. In a specific embodiment, the traffic having the shortest TTI is assigned the highest priority. The processing deadline for the traffic can also be used to determine priority. For example, a traffic having a longer TTI may be waiting in the buffer past its deadline, and may be selected for processing. Other factors can also be used to determine the priority of the traffic and are within the scope of the invention.

Figure 4B:
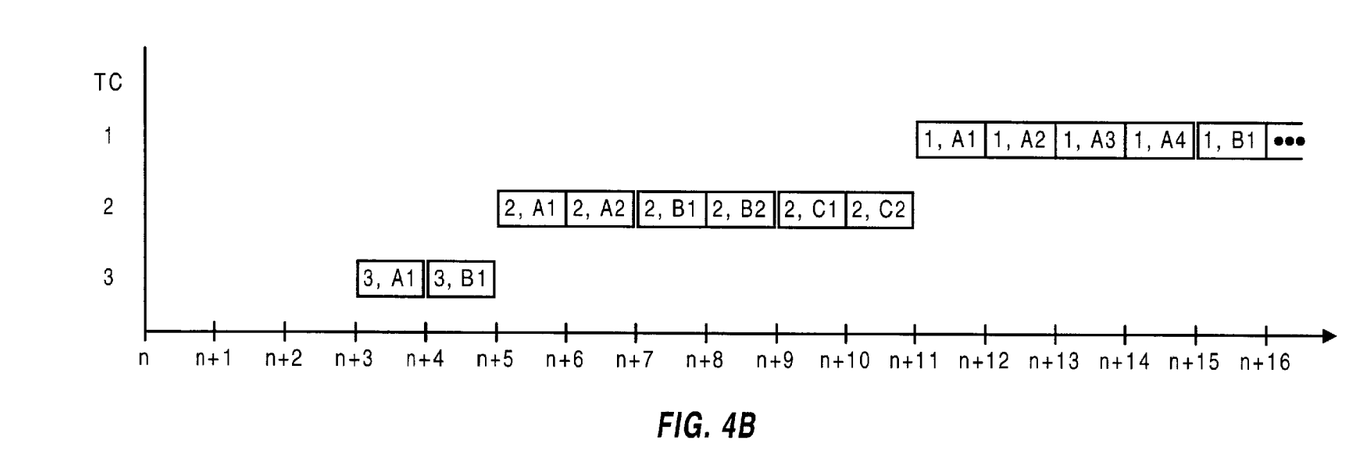
FIGS. 4B and 4C are diagrams that illustrate two embodiments of the processing of the received traffics.

FIG. 4B is a diagram that illustrates an embodiment of the processing of the received traffics shown in FIG. 4A. In this embodiment, the decoder is able to process one TTI of symbols for each frame interval. At frame index n+3, the traffic on transport channel 3 is available and processed by data processor 322 and decoder 324. At frame index n+4, the traffics on transport channels 2 and 3 are available for processing, but the TTI for the traffic on transport channel 3 is shorter than the TTI for the traffic on transport channel 2. As a result, the traffic on transport channel 3 is processed. At frame index n+5, the traffic on transport channel 2 is processed since the other transport channels are not ready for processing. At frame index n+7, the traffics on transport channels 1 and 2 are ready for processing, but the traffic on transport channel 2 is processed since it has the shorter TTI. At frame index n+9, the traffic on transport channel 2 is processed, again since it has a shorter TTI than that of the traffic in transport channel 1. At frame index n+11, the traffic on transport channel 1 is processed since is the only one ready. And at frame index n+15, another traffic on transport channel 1 is processed.

FIG. 4B shows a specific embodiment in which processing is performed starting at the frame boundary. Also, FIG. 4B shows processing being performed for an entire radio frame. These conditions may simplify the scheduling of the traffics for processing. However, other scheduling routines can also be used and are within the scope of the invention. For example, the decoding of a radio frame of symbols may be achieved in less time than a frame interval. The faster decoding speed may allow for the decoding of multiple radio frames of symbols within a frame interval, and may also allow for the decoding of the traffics as they are received.

In accordance with an aspect of the invention, the processing of a traffic can be interrupted if another traffic is ready and has higher priority. In the W-CDMA system, each traffic comprises a number of coded blocks. At the transmitter unit, each coded block is coded individually and includes its own set of code tail bits. At the receiver unit, each coded block can be processed individually and independently without reference to other coded blocks. To interrupt the processing of a traffic, information indicative of the states of the processing at the time of the interruption can be saved and used later to resume the processing of the interrupted traffic.

Figure 4C:
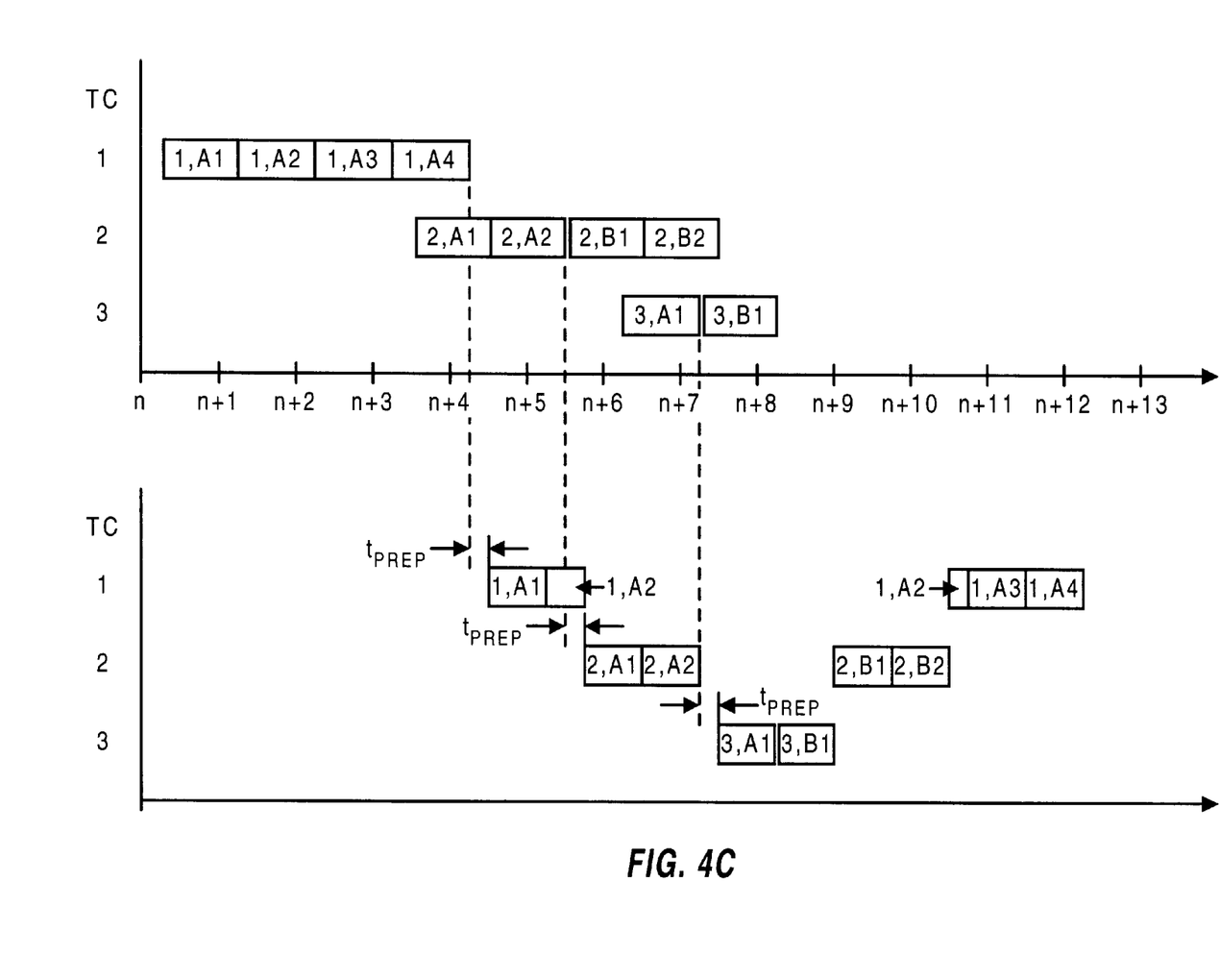

FIG. 4C is a diagram that illustrates another embodiment of the processing of the received traffics. In this embodiment, the decoding of a traffic can commence shortly after the traffic is received (i.e., does not have to wait for the start of the next frame boundary), and the decoding for each radio frame of symbols can be achieved in less than one frame interval. Also, in this embodiment, the decoding of a lower priority traffic can be interrupted such that a higher priority traffic can be decoded earlier, without having to wait for the decoding of the lower priority traffic to be completed.

As shown at the top half of FIG. 4C, a complete traffic comprising radio frames (1,A1), (1,A2), (1,A3), and (1,A4) is received for transport channel 1 after frame index n+4. Controller 320 is informed of the received traffic and, in response, updates its table, determines the necessary parameters, and directs data processor 322 and decoder 324 to start processing the coded blocks in the traffic. After a time period, $t_{PREP}$, required to prepare for the processing, data processor 322 and decoder 324 then process the blocks, as directed by controller 320.

In the embodiment shown in FIG. 4C, data processor 322 and decoder 324 process one coded block at a time, as directed by controller 320. Controller 320 continually determines the coded block having the highest priority and, upon receiving an indication (e.g., from data processor 322, or decoder 324, or both) that the current block is processed, schedules the processing of the next code block having the highest priority. If the processing of a particular traffic is interrupted because another traffic has higher priority, the controller saves the necessary state information so that the processing can be resumed later from the place where it was interrupted.

As shown in the lower half of FIG. 4C, data processor 322 and decoder 324 process radio frame (1,A1) and part of radio frame (1,A2) from transport channel 1. In this simple example, the TTI of the traffic is the only factor used in determining priority. Thus, when the traffic on transport channel 2 having a TTI of 2 is received, controller 320 can schedule the processing of this traffic since it has a lower TTI than the TTI of 4 of the traffic being processed. The state information for the traffic for transport channel 1 is stored before commencing the processing of the traffic for transport channel 2. In similar manner, when the traffic on transport channel 1 having a TTI of 1 is received, controller 320 schedules the processing of this traffic since it has a lower TTI than the TTI of 2 of the traffic being processed. Again, the state information for the traffic for transport channel 2 is stored before commencing the processing of the traffic for transport channel 3.

Once the traffics for transport channel 3 have been processed, controller 320 schedules the processing of the remaining traffic for transport channel 2 since it has the highest priority. Similarly, once the traffics for transport channel 2 have been processed, controller 320 schedules the processing of the remaining traffic for transport channel 1.

FIG. 4B and 4C show two specific embodiments of the processing of the received traffics. Other embodiments to schedule coded blocks for processing can be contemplated and are within the scope of the invention. Typically, a traffic includes one or more coded blocks that span the number of radio frames defined by the TTI. Due to the interleaving, each traffic is typically processed as a whole in its entirety rather than in individual radio frame portions or coded block portions. However, in some embodiments, the processing of a traffic may be interrupted, as shown above in FIG. 4C, to achieve certain design goals (e.g., giving higher priority to traffics having lower TTIs), and this is within the scope of the invention.

Figure 6:
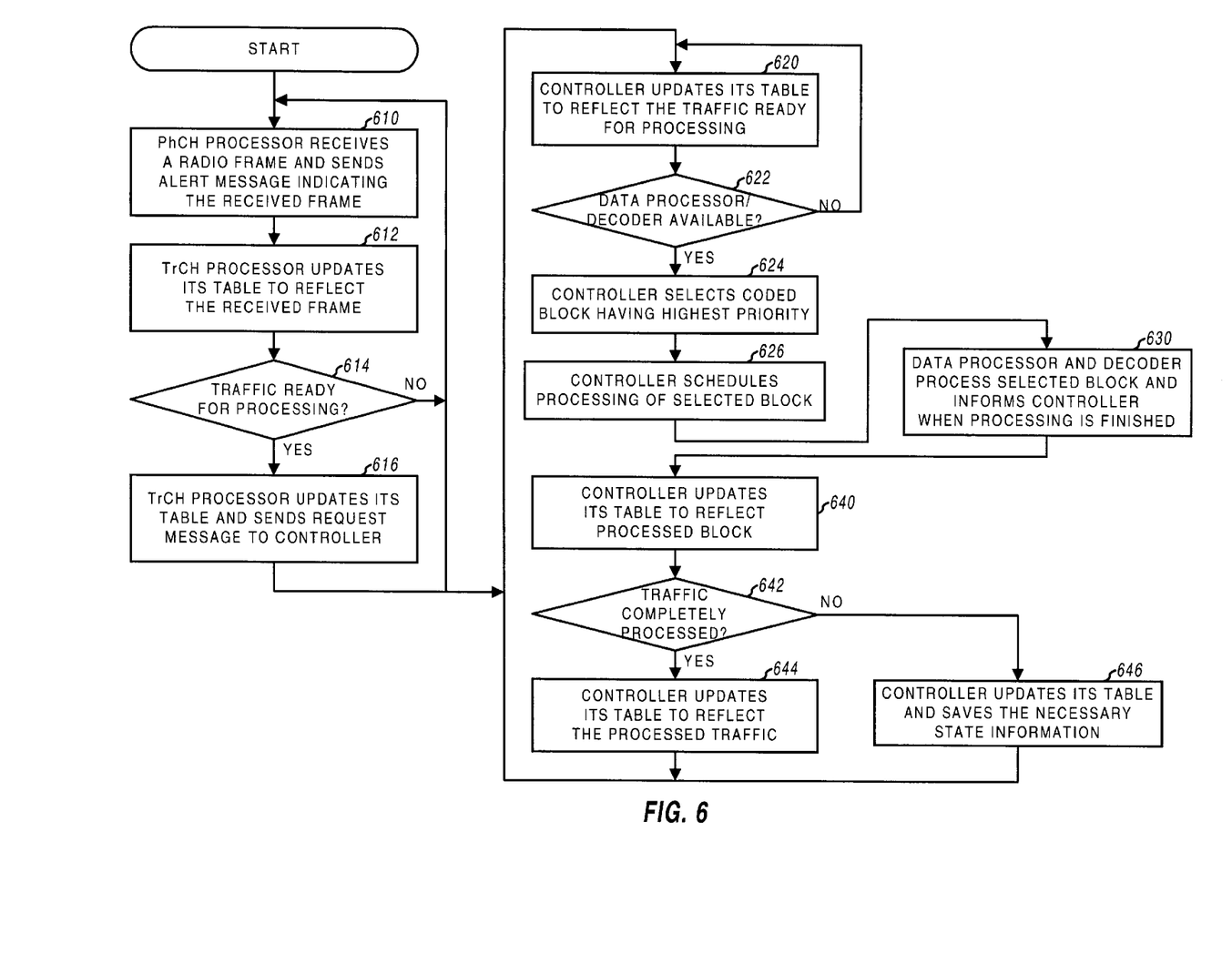
FIG. 6 is a flow diagram of an embodiment of the processing of the traffics in accordance with the invention.

FIG. 6 is a flow diagram of an embodiment of the processing of the traffics in accordance with the invention. Initially, the physical channel (PC) processor receives a radio frame and sends an alert message to the transport channel (TC) processor indicating the received radio frame, at step 610. The transport channel processor then updates its table to reflect the received radio frame, at step 612. As each radio frame is received, the transport channel processor also determines whether the traffic corresponding to that radio frame is ready for processing, at step 614. If the traffic is ready for processing (i.e., all radio frames for that traffic have been received), the transport channel processor sends a request message to the controller and updates its table accordingly (e.g., resets the entry for that traffic). After updating the table, or if it is determined that the traffic is not ready for processing back at step 614, the process returns to step 610.

Upon receiving the request message, the controller updates its table to reflect the new traffic that is ready for processing, at step 620. This updating typically includes generating a new entry in the table for the new traffic and gathering parameters associated with the traffic, as described below.

Periodically or aperiodically (e.g., whenever interrupted by transport channel processor 314), the controller determines whether the data processor and decoder are available for processing, at step 622. If the data processor and/or decoder is busy, the controller loops back to step 620. Otherwise, the controller selects the coded block that is ready for processing and having the highest priority, at step 624. Again, the priority may be based on the TTIs of the traffics that are ready for processing, the delays experienced by the traffics, the deadlines of the traffics, some other factors, or a combination thereof. The controller then schedules the processing of the selected block, at step 626.

The data processor and decoder process the selected block and inform the controller when the processing of the block is finished, at step 630. Upon receiving a signal indicating that the selected block is processed, the controller updates its table to reflect the processed block, as step 640. The controller then determines whether the traffic corresponding to the processed block has been completely processed, as step 642. If the traffic is completely processed, the controller updates its table to reflect the processed traffic, at step 644. This updating typically includes resetting the fields in the table. The controller may then initiate the code block concatenation, transport block segmentation, (block 272 in FIG. 2B), and the CRC check for the traffic (block 274). Upon successful completion of these tasks, the entry for the traffic is removed from the table.

Alternatively, if it is determined at step 642 that the current traffic is not completely processed, the controller updates its table and saves the necessary state information for the traffic, at step 646. The table update typically includes decrementing the number of coded blocks field in Table 2. The saved state information allows the data processor and decoder to resume processing of the traffic should its processing be interrupted. After completing step 644 or 646, the controller returns to step 620.

A number of different tasks are typically performed in conjunction with instructing the data processor and decoder to process a coded block. These tasks facilitate the signal processing at the receiver unit in a manner that is complementary to the signal processing performed at the transmitter unit. Referring back to FIG. 2B for the downlink transmission in the W-CDMA system, the signal processing at the receiver unit for each transport channel includes concatenating the received radio frames into traffics (block 262), de-interleaving each traffic (block 264), performing the inverse rate matching (block 268), and decoding the coded blocks in the traffic (block 270). The concatenation of the received radio frames into traffics (block 262) is performed by transport channel processor 314.

In an embodiment, controller 320 directs the operation of the processing in blocks 264 through 270. For example, the parameters necessary to perform the de-interleaving (block 264) are provided to data processor 322, which then implements the de-interleaving. The de-interleaving parameters may include, for example, a count value indicative of the next sample to be retrieved, an index to second buffer 316 that stores the coded block to be processed, the TTI for the block, and so on. The starting addresses of the selected block in second buffer 316 may be provided to an address generator within data processor 322, which then generates the address for second buffer 316. The parameters needed to perform the inverse rate matching (e.g., $e_{ini}$, $e_{plus}$, $e_{minus}$, a, N, turbo_code_and_pruning, number of information bits per coded block, and so on) may be provided to data processor 322, which then performs the inverse rate matching (block 268). The decoding type (e.g., Viterbi, Turbo, or none) and the code rate (if applicable) may be provided to decoder 324. And the parameters needed to perform the CRC parity check (e.g., K, which denotes the number of decoded bits per transport block, CRC pattern, and so on) may also be provided to decoder 324, which then uses these values to perform the CRC check.

Once data processor 322 and decoder 324 are properly initialized, the samples in the selected block are retrieved from second buffer 316 in de-interleaved order and provided to data processor 322. Data processor 322 executes the data rate algorithm to determine whether to accumulate symbols that have been repeated or to supply "don't cares" to punctured symbols. The symbol sequence from data processor 322 is then provided to decoder 324 for decoding. The decoded data from decoder 324 can be temporarily stored to a decoder buffer (not shown in FIG. 3) or provided to the data sink.

In an embodiment, if the processed block is not the last block in the traffic, sufficient state information is saved to allow the processing to resume if the processing of the traffic is interrupted. In an embodiment, the saved state information includes the DIL count for the de-interleaving and the e count for the inverse rate matching.

Controller 320 can be designed to support a number of different processing modes. For example, controller 320 can be designed to support one or more of the processing modes described in Table 3, or some other modes, or a combination thereof.

TABLE 3

| Mode | Description |
| --- | --- |
| 1 | fixed position with TFCI |
| 2 | flexible position with TFCI |
| 3 | fixed position with BTFD |
| 4 | flexible position with BTFD |

In Table 3, fixed/flexible position identifies how the transport channels are concatenated to form a physical channel radio frame. For fixed position, each transport channel is padded with DTX to a particular size and the padded transport channels are then concatenated. For flexible position, all transport channels are concatenated together and the DTX are padded at the end.

In modes 1 and 2, the transport format for the traffics is available and used in the processing of the traffics. The transport format may include, for example, the number of coded blocks in each traffic, the number of information bits for each coded block, the rate matching parameters ($e_{ini}$, $e_{plus}$, $e_{minus}$, a, N, turbo_code_and_puncturing), and others. In modes 3 and 4, the transport format is unknown and the processing can be performed based on the available (albeit incomplete) information.

Figure 7:
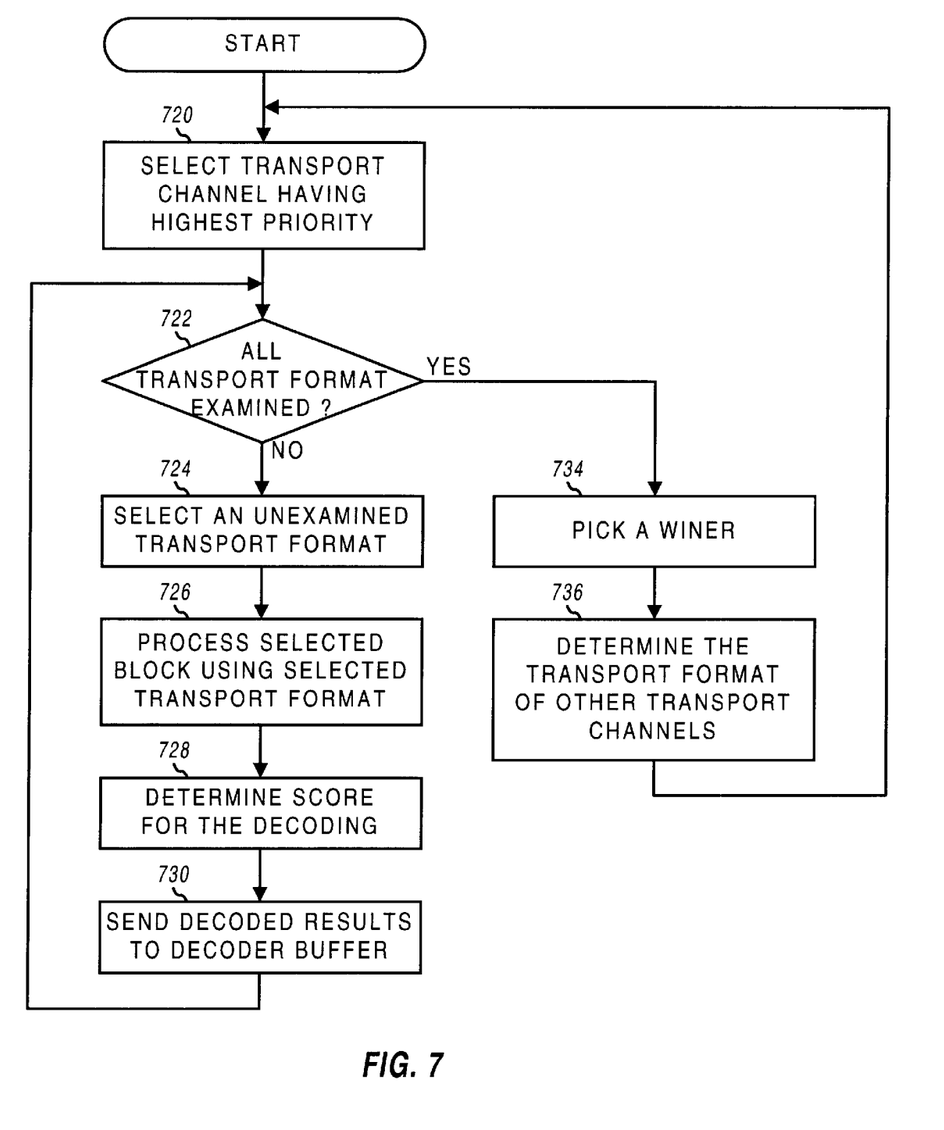
FIG. 7 is a flow diagram of an embodiment of the processing of the traffics for various processing modes.

FIG. 7 is a flow diagram of an embodiment of the processing of the traffics. Initially, the transport channel having the highest priority is selected, at step 720. A determination is then made whether all transport formats for the selected transport channel have been examined, at step 722. If all transport formats have not been examined, an unexamined transport format is selected, in step 724. The selected block is then processed using the selected transport format, at step 726. The score for the decoding is then determined, at step 728, and the decoded results are sent to a decoder buffer, at step 730. The process then returns to step 722.

Back at step 722, if all transport formats for the selected transport channel have been examined, a winning transport format is selected, at step 734. This can be achieved by examining the scored determined at step 728 for each transport format processed. The transport format of other transport channels is then determined, at step 736, and the process then returns to step 720.

Various modifications can be made to the embodiment shown in FIG. 7. For example, at step 720, the traffic having the highest priority can be selected. Also, at step 724, only an unexamined but worthy-of-examination transport format may be selected for processing the traffic. Thus, various techniques to process the traffics can be contemplated and are within the scope of the invention.

Referring back to FIG. 3, a single set of data processor 322 and decoder 324 is shown for processing the received transport channels in the manner described above. For improved performance, one or more buffers 316, one or more data processors 322, and one or more decoders 324, or a combination thereof, can be used to (concurrently) process multiple transport channels. For example, one set of data processor and decoder can be used to process a first transport channel coded with a first encoding format (e.g., convolutional code), another set of data processor and decoder can be used to process a second transport channel coded with a second encoding format (e.g., Turbo code), and so on. The parallel processing of the transport channels may further reduce processing delays.

The processing units described herein (e.g., physical channel processor 310, transport channel processor 314, controller 320, data processor 322, decoder 324, and others) can be implemented in various manners. For example, each of these processing units can be implemented in an application specific integrated circuit (ASIC), a digital signal processor, a microcontroller, a microprocessor, or other electronic circuits designed to perform the functions described herein. The processing units can also be integrated into one or more integrated circuits. Also, the processing units can be implemented with a general-purpose or specially designed processor operated to execute instruction codes that achieve the functions described herein. Thus, the processing units described herein can be implemented using hardware, software, or a combination thereof.

The memory units (e.g., first buffer 312, second buffer 316, and others) can be implemented with various memory technologies such as, for example, random access memory (RAM), Flash memory, and others. The memory unit can also be implemented with storage elements such as, for example, a hard disk, a CD-ROM drive, and others. Various other implementation of the memory units are possible and within the scope of the present invention.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for processing transmissions in a communications system, the method comprising:
    receiving and assembling a plurality of samples into one or more traffics, wherein each traffic includes one or more portions suitable for processing independently;
    determining a priority of each portion;
    selecting a first portion in a first traffic having a highest priority; and
    scheduling the selected first portion of the first traffic for processing in accordance with a particular processing scheme to provide output data; and
    maintaining a first table for the one or more traffics, wherein an entry is provided in the first table for each traffic and includes
        a first value indicative of a number of radio frames included in the traffic, and
        a second value indicative of a number of radio frames received for the traffic.

2. The method of claim 1, wherein the priority of each traffic is determined and used to schedule the processing of the one or more traffics.

3. The method of claim 1, fiber comprising:
    processing the selected first portion in accordance with the particular processing scheme.

4. The method of claim 3, wherein the scheduling and processing are performed in parallel.

5. The method of claim 3, wherein a plurality of traffics are processed in parallel.

6. The method of claim 1, wherein the priority of each portion is determined based in part on its processing delays requirement.

7. The method of claim 6, wherein the processing delays requirement of each portion is estimated based on an interleaving time interval over which samples in the traffic that includes the portion are interleaved.

8. The method of claim 6, wherein the processing delays requirement of each portion is estimated based on the speed of a decoder used to process the portions.

9. The method of claim 1, further comprising:
    receiving and processing a modulated signal to provide the plurality of samples.

10. The method of claim 1, wherein each portion corresponds to a coded block in a particular traffic.

11. The method of claim 7, wherein the interleaving time interval for each traffic is selected from one of a plurality of possible transmission time intervals.

12. The method of claim 11, wherein the plurality of possible transmission time intervals include 10 msec, 20 msec, 40 msec, and 80 msec.

13. The method of claim 6, wherein the processing delays requirement of each portion is estimated based on a processing deadline.

14. The method of claim 1, further comprising:
    repeating the determining, selecting, and scheduling for each scheduling period.

15. The method of claim 1, further comprising:
    repeating the determining, selecting, and scheduling upon receiving an indication that another portion may be processed.

16. The method of claim 1, further comprising:
    interrupting the processing of the first traffic;
    selecting a first portion in a second traffic having a highest priority; and
    scheduling the selected first portion of the second traffic for processing.

17. The method of claim 16, further comprising:
    saving state information related to the processing of the first traffic.

18. The method of claim 16, further comprising:
    selecting a second portion of the first traffic for processing; and
    resuming the processing on the interrupted first traffic by scheduling the second portion of the first traffic for processing.

19. The method of claim 1, wherein the processing includes
    reordering the samples in the selected first portion of the first traffic in accordance with a particular reordering scheme, and
    decoding the reordered samples in the selected first portion of the first traffic.

20. The method of claim 19, wherein the processing further includes
    accumulating redundant samples and inserting place holders for deleted samples in the selected first portion of the first traffic.

21. The method of claim 1, further comprising:
    maintaining a second table for zero or more traffics that are ready for processing, wherein an entry is provided in the second table for each traffic ready for processing and includes
        a first value indicative of a number of portions in the traffic.

22. The method of claim 21, wherein the entry in the second table for each traffic ready for processing further includes
    a second value indicative of a particular processing mode to be used for the traffic.

23. The method of claim 21, wherein the entry in the second table for each traffic ready for processing further includes
    a third value indicative of a processing deadline for the traffic.

24. The method of claim 21, wherein the entry in the second table for each traffic ready for processing further includes
    a set of one or more values indicative of state information related to the processing of the traffic.

25. The method of claim 1, wherein the one or more traffics conform to a W-CDMA standard.

26. The method of claim 25, wherein each traffic is associated with a particular transport channel to be used for the data transmission.

27. A receiver unit operative to process transmissions in a communications system, comprising:
    a channel processor operative to process a plurality of samples to provide one or more traffics, wherein each traffic includes one or snore portions suitable for processing independently;
a buffer coupled to the channel processor and operative to store the one or more traffics;
a data processor coupled to the buffer and operative to retrieve a particular portion of a particular traffic from the buffer and to process the retrieved portion in accordance with a particular processing scheme; and
a controller coupled to the channel processor and the data processor, the controller operative to
determine a priority of each portion stored in the buffer based on its processing delays requirement,
select a first portion in a first traffic having a highest priority, and
schedule the selected first portion of the first traffic for processing by the data processor.

28. The receiver unit of claim 27, further comprising:
a decoder coupled to the data processor and operative to receive and decode portions that have been processed by the data processor.

29. The receiver unit of claim 27, wherein the controller is further operative to
estimate the processing delays requirement of each portion based on a processing deadline, an interleaving dine interval over which samples in the traffic that includes the portion are interleaved, or a combination thereof.

30. The receiver unit of claim 27, wherein the controller is further operative to
repeat determining the priorities of portions ready for processing, selecting the highest priority portion, and scheduling the selected portion for each scheduling period or upon receiving an indication that another portion may be processed.

31. The receiver unit of claim 27, wherein the controller is further operative to
interrupt processing of the first traffic,
save state information related to the processing of the first traffic,
select a first portion in a second traffic having a highest priority, and
schedule the selected first portion of the second traffic for processing.

32. The receiver unit of claim 31, wherein the controller is further operative to
select a second portion of the first traffic for processing, and
resume the processing on the interrupted first traffic by scheduling the second portion of the first traffic for processing.

33. The receiver unit of claim 27, wherein the data processor is operative to
reorder the samples in the selected first portion of the first tic in accordance with a particular reordering scheme, and
accumulate redundant samples and inserting place holders for deleted samples in the selected first portion of the first traffic.

34. A receiver unit operative to process a modulated signal in a W-CDMA system, comprising:
a receiver operative to receive and process the modulated signal to provide samples;
a channel processor coupled to the receiver and operative to process the samples to provide one or more traffics, wherein each traffic includes one or more radio frames and each radio frame includes one or more coded block of samples;
a buffer coupled to the channel processor and operative to store the one or more traffics;
a controller coupled to the channel processor and operative to
determine a priority of each portion stored in the buffer based on its processing delays requirement, wherein each portion corresponds to a radio frame or a coded block in a particular traffic and is suitable for processing independently, and wherein the processing delays requirement of each portion is estimated based on a processing deadline, an interleaving time interval over which samples in the traffic that includes the portion are interleaved, or a combination thereof,
select a first portion in a first traffic having a highest priority, and
schedule the selected first portion of the first traffic for processing;
a data processor coupled to the buffer and the controller, the data processor operative to retrieve the first portion of the first traffic from the buffer and to process the retrieved portion in accordance with a particular processing scheme; and
a decoder coupled to the data processor and operative to receive and decode the processed first portion of the first traffic.

35. An integrated circuit comprising:
a channel processor operative to process a plurality of samples to provide one or more traffics, wherein each traffic includes one or more portions suitable for processing independently, the channel processor further being operative to maintain a first table for the one or more traffics, wherein an entry is provided in the first table for each traffic and includes
a first value indicative of a number of radio frames included in the traffic, and
a second value indicative of a number of radio frames received for the traffic;
a buffer coupled to the channel processor and operative to store the one or more traffics;
a data processor coupled to the buffer and operative to retrieve a particular portion of a particular traffic from the buffer and to process the retrieved portion in accordance with a particular process scheme; and
a controller coupled to the channel processor and the data processor, the controller operative to
determine a priority of each portion stored in the buffer,
select a first portion in a first traffic having a highest priority, and
schedule the selected first portion of the first traffic for processing by the data processor.

36. The integrated circuit of claim 35, wherein the channel processor is further operative to maintain a second table for zero or more traffics that are ready for processing, wherein an entry is provided in the second table for each traffic ready for processing and the entry includes
a first value indicative of a number of portions in the traffic.

37. The integrated circuit of claim 36, wherein the entry in the second table for each traffic ready for processing further includes
a second value indicative of a particular processing mode to be used for the traffic.

38. The integrated circuit of claim 36, wherein the entry in the second table for each traffic ready for processing further includes a third value indicative of a processing deadline for the traffic.

39. The integrated circuit of claim 36, wherein the entry in the second table for each traffic ready for processing further includes a set of one or more values indicative of state information related to the processing of the traffic.

40. An article of manufacture comprising:

a computer usable medium having computer readable program code means embodied therein for processing transmissions in a communications system, the computer readable program code means in said article of manufacture comprising:

computer readable program code means for receiving and assembling a plurality of samples into one or more traffics, wherein each traffic includes one or more portions suitable for processing independently;

computer readable program code means for determining a priority of each portion;

computer readable program code means for selecting a first portion in a first traffic having a highest priority;

computer readable program code means for scheduling the selected first portion of the first traffic for processing in accordance with a particular processing scheme to provide output data; and computer readable program code means for maintaining a first table for the one or more traffics, wherein an entry is provided in the first table for each traffic and includes a first value indicative of a number of radio frames included in the traffic, and a second value indicative of a number of radio frames received for the traffic.

41. A program storage device readable by a machine, tangibly embodying a program of instructions executable by the machine to perform method steps for processing transmissions in a communications system, said method steps comprising:

receiving and assembling a plurality of samples into one or more traffics, wherein each traffic includes one or more portions suitable for processing independently;

determining a priority of each portion;

selecting a first portion in a first traffic having a highest priority;

scheduling the selected first portion of the first traffic for processing in accordance with a particular processing scheme to provide output data; and maintaining a first table for the one or more traffics, wherein an entry is provided in the first table for each traffic and includes a first value indicative of a number of radio frames included in the traffic, and a second value indicative of a number of radio frames received for the traffic.

42. A device for processing transmissions in a communications system comprising:

means for processing a plurality of samples to provide one or more traffics, wherein each traffic includes one or more portions suitable for processing independently;

means for maintaining a first table for the one or more traffics, wherein an entry is provided in the first table for each traffic and includes a first value indicative of a number of radio frames included in the traffic, and a second value indicative of a number of radio frames received for the traffic;

means for storing the one or more traffics coupled to the means for processing;

means for retrieving a particular portion of a particular traffic from the means for storing and processing the retrieved portion in accordance with a particular processing scheme; and means for determining a priority of each portion stored in the means for storing, selecting a first portion in a first traffic having a highest priority, and scheduling the selected first portion of the first traffic for processing by the means for retrieving.

* * * * *